No. 707,514.  
L. S. KALLAJIAN.  
HANDLE BAR SUPPORT.  
(Application filed June 28, 1901.)  
Patented Aug. 19, 1902.
(No Model.)
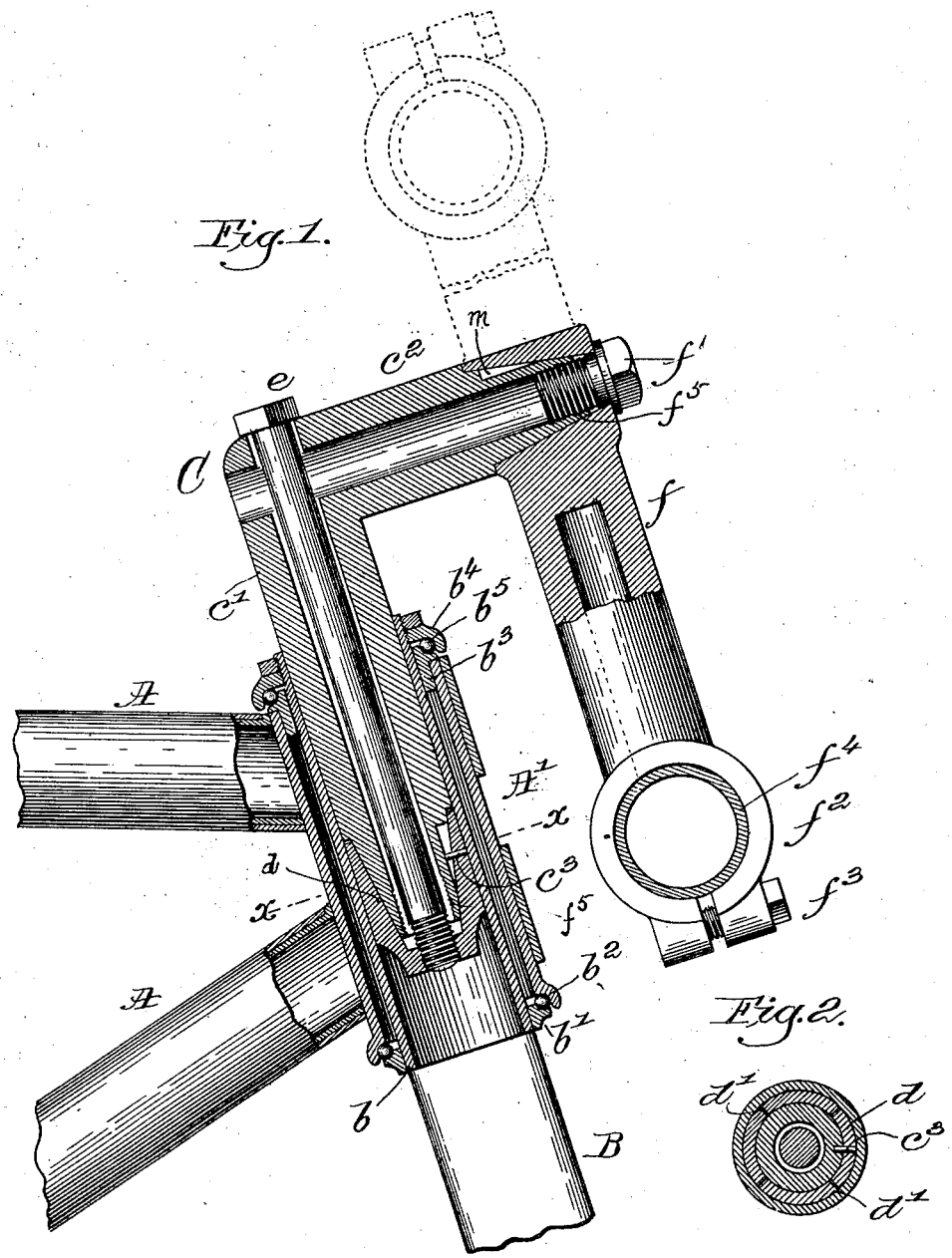

UNITED STATES PATENT OFFICE.

LAZARUS S. KALLAJIAN, OF BOSTON, MASSACHUSETTS.

HANDLE-BAR SUPPORT.

SPECIFICATION forming part of Letters Patent No. 707,514, dated August 19, 1902.

Application filed June 28, 1901. Serial No. 66,322. (No model.)

*To all whom it may concern:*

Be it known that I, LAZARUS S. KALLAJIAN, a citizen of the United States, residing at Boston, in the county of Suffolk and State of Massachusetts, have invented an Improvement in Handle-Bar Supports, of which the following description, in connection with the accompanying drawings, is a specification, like letters on the drawings representing like parts.

This invention relates to what are known in the trade as "forward-extension handle-bars," and has for its object to provide a handle-bar post of this character which allows a greatly-increased range of adjustment for the height of the handle-bars.

The invention comprises a reversible handle-bar post of substantially L shape, either arm of which may be clamped or secured to the steering-head of the bicycle and on the other arm of which the handle-bars are adapted to be secured. The arms of the handle-bar post are of different lengths, whereby when the longer arm is inserted into the steering-head of the bicycle and the handle-bars are supported on the shorter arm thereof the said handle-bars are brought comparatively near the bicycle-head, while when the short arm is inserted into the steering-head and the handle-bars are attached to the end of the longer arm they are removed some distance from the bicycle-head. To increase the range of the vertical adjustment of the handle-bars, I provide what I term a "bar-holder," which is adapted to be secured to the forwardly-extending arm of the handle-bar post, said bar-holder comprising an elongated stem to the end of which the handle-bar proper of the bicycle is secured. The bar-holder is connected to the forwardly-extending arm of the handle-bar post so as to be rotatable thereupon, whereby when the said bar-holder depends from the said forwardly-extending arm the handle-bars are situated some distance below said arm, so that the rider will have to stoop to grasp the same, while when the position of the bar-holder is reversed, so that the bar-holder extends upwardly from said forwardly-extending arm, the handle-bars are elevated to such a height that the rider will sit erect. This adjustment of the handle-bar holder, together with the vertical adjustment of the handle-bar post in the steering-head, allows the handle-bars to be placed in any desired position within a comparatively large range.

Another feature of my invention relates to the means for clamping the handle-bar post into the steering-head.

Figure 1 is a partial elevation and section of a sufficient portion of a bicycle with my improvements applied thereto to enable the same to be understood, and Fig. 2 is a section on the line $x\ x$.

The frame A of the bicycle is of any approved or usual construction and has the front head A', which receives the tubular stem $b$ of the usual front wheel or steering-fork B, the said tubular stem having fixed to it a collar, as $b'$, upon which rests suitable balls $b^2$, confined in the usual cup-bearing at the lower end of the head A'. The upper end of said head receives the collar $b^3$, through which the tubular stem $b$ is extended, and above said collar suitable threads cut on the tubular stem $b$ are engaged by a flanged collar or cup-bearing $b^4$, in which are confined the usual balls $b^5$, which are sustained upon the collar $b^3$. The parts thus far described are such as are commonly found in bicycles and form no part of my present invention, which relates to the means for supporting the handle-bar.

The handle-bar supporter or post C is of the forwardly extension type, and is reversible, it comprising as shown the L-shaped member having the two arms $c'\ c^2$ of different lengths, either of which may be inserted into the steering-head of the bicycle and clamped therein, the other of said arms extending forwardly from the said head and adapted to support the handle-bars. Each arm is hollow, as shown, and is provided on its interior near its end with the screw-threads $f^5$ for a purpose presently to be described. The ends of both arms $c'\ c^2$ are cone-shaped, as illustrated, and the cone-shaped end of that arm which is inserted in the steering-head receives thereover the expander $d$, which has a cylindrical exterior adapted to engage the inside of the tubular stem $b$ and a conical interior bore shaped to fit the conical end of the arm, the said expander carrying a pin $c^3$, which engages a suitable slot $m$ to prevent relative rotation between the expander and arm. The expander is provided with a series of slits $d'$ and with a central screw-threaded aperture through which the screw-threaded end of the bolt $e$ is adapted to be inserted. In Fig. 1 the longer arm of the handle-bar post is shown as inserted in the steering-head, and after the said post has been adjusted to the proper height in the said head the bolt $e$ will be turned, thereby giving the expander $d$ a longitudinal movement relative to the arm $c'$, the conical end of said arm expanding the expander and forcing the same tightly against the interior of the tubular stem $b$, thereby locking the handle-bar post at the desired elevation. Since the end of each arm is constructed precisely the same, both arms being provided with the conical portion, the interior screw-threads $f^5$, and the keyway $m$, it will be seen that the handle-bar post may be removed from the steering-head and reversed, the shorter arm being inserted therein instead, in which case the expander $d$ will coöperate with the conical portion of the shorter arm in the same way that it does with the longer arm in Fig. 1. It will be understood, of course, that when the shorter arm is inserted into the steering-head a bolt $e$ of the appropriate length will be used to operate the expander. That arm which projects forwardly is adapted to have the handle-bar secured thereto, and, as illustrated, in order to obtain as great a range of vertical adjustment for the handle-bars as possible I provide a bar-holder $f$, having an elongated stem portion and provided at one end with a conical eye adapted to fit the conical end of that arm which forms the forward extension, the other end of the said bar-holder having the split ring $f^2$, through which the handle-bar $f^4$ is inserted, the said split ring being provided with the usual screw-threaded ears through which the clamp-screw $f^3$ passes. The bar-holder is secured to the forwardly-extending arm by means of a screw $f'$, having a shoulder thereon to engage the bar-holder, the screw-threaded portion of said screw engaging the screw-threads $f^5$ on the interior of the forwardly-extending arm.

Fig. 1 shows the stem of the bar-holder as extending downwardly from the forwardly-extending arm $c^2$, thereby carrying the handle-bars some distance below said forwardly-extending arm and nearly to the periphery of the front wheel. By loosening the screw $f'$, however, the bar-holder may be swung to the dotted-line position, thereby carrying the handle-bars above the forwardly-extending arm and in such position that the rider may sit erect. The full and dotted line positions represent the two extreme positions of the handle-bar, and intermediate adjustment may be secured by adjusting the arms $c'$ in the steering-head or by reversing the handle-bar post and inserting the shorter arm $c^3$ into the steering-head. Still further adjustment may be secured by reversing the position of the handle-bars in the bar-holder, and by means of these various adjustments any desired vertical position of the handle-bars may be attained. By my invention, therefore, I secure a great range of vertical adjustment for the handle-bars and also provide means whereby the said bars may be placed nearer to or farther from the steering-head.

Believing that I am the first to provide a rigid one-piece forward-extension handle-bar post which is reversible, I desire to claim the same broadly. I also desire to state that various changes may be made in the details of the device without departing from the spirit of the invention as expressed in the claims.

Having described my invention, what I claim as new, and desire to secure by Letters Patent, is—

1. In a bicycle, a reversible handle-bar post, both ends of which are adapted to be inserted in the steering-head, an expander on the interior of said steering-head and adapted to coöperate with that end of the handle-bar post inserted into the said head, means to operate said expander from the exterior of the steering-head, and means to secure the handle-bar to the projecting end of the said handle-bar post.

2. In a bicycle, a rigid one-piece handle-bar post of substantially L shape, both arms of which are constructed to be capable of insertion in the steering-head of the bicycle, an expanding device on the interior of said steering-head and adapted to coöperate with the end of that arm of the handle-bar post which is inserted in the steering-head to clamp said handle-bar post in position, and a reversible bar-holder secured to the projecting arm of the handle-bar post, said handle-bar holder having an elongated stem to the end of which the handle-bars are secured.

3. In a bicycle, a substantially L-shaped handle-bar post, both arms of which are constructed so as to be capable of insertion in the steering-head, an expander on the interior of the steering-head adapted to receive the end of that arm of the handle-bar post which is inserted in the said steering-head, means extending through the said arm of the handle-bar post to render said expander operative to clamp the handle-bar post in position, combined with a bar-holder secured to the projecting end of the said handle-bar post.

4. In a bicycle, a rigid, substantially L-shaped handle-bar post, both arms of which are constructed to be capable of insertion into the steering-head of the bicycle, an expander on the interior of said steering-head, adapted to coöperate with that arm of the handle-bar post which is inserted in said head, and means accessible from the exterior of said head to operate the expander, combined with a reversible handle-bar holder detachably connected to the projecting end of the handle-bar post.

5. In a bicycle, a substantially L-shaped handle-bar post, both arms of which have conical ends and are constructed to be capable of insertion into the steering-head of the bicycle, an expander on the interior of said head, constructed to receive the conical end of that arm of the handle-bar post inserted into the head, said expander operating to clamp the handle-bar post in position, means accessible from the exterior of said head to operate the expander, and a handle-bar holder adapted to be secured to the conical end of the projecting arm of said handle-bar post.

6. In a bicycle, a rigid one-piece handle-bar post of substantially L shape, both arms of which are constructed to be capable of insertion in the steering-head, an expanding device on the interior of the said steering-head and adapted to coöperate with the end of that arm of the handle-bar post which is inserted in the steering-head to clamp said handle-bar post in position, means to operate the said expander from the exterior of the steering-head, and a reversible bar-holder secured to the projecting arm of the handle-bar post.

7. In a bicycle, a substantially L-shaped handle-bar post, both arms of which are constructed to be inserted in the steering-head of a bicycle, means on the interior of said steering-head to coöperate with either arm of the handle-bar post and clamp the same in the said steering-head, said means being operable from the exterior of the head, a bar-holder having an elongated stem to the end of which the handle-bars are secured, and means whereby the bar-holder may be detachably secured to the projecting end of the handle-bar post with the stem of the said bar-holder either depending from the projecting end of the handle-bar post or extending upwardly therefrom.

8. In a bicycle, a substantially L-shaped handle-bar post, each arm thereof having a conical end portion and adapted to be inserted in the steering-head of the bicycle, an expander adapted to engage that arm which is in the head, and a bar-holder having a conical eye to receive the end of the other arm.

9. In a bicycle, a substantially L-shaped handle-bar post having arms of different length, each arm having a conical end portion and adapted to be inserted in the steering-head of the bicycle, an expander adapted to engage that arm which is in the head, and a bar-holder having a conical eye to receive the end of the other arm.

10. In a bicycle, a reversible handle-bar post having both ends thereof substantially conical in shape, an expander having an exterior shaped to fit the interior of the steering-head of a bicycle, said expander having a conical bore adapted to receive either end of the handle-bar post, and an adjusting-bolt passing longitudinally through the handle-bar post and having a screw-threaded engagement with the expander, combined with a bar-holder constructed to be secured to the projecting end of the handle-bar post.

In testimony whereof I have signed my name to this specification in the presence of two subscribing witnesses.

LAZARUS S. KALLAJIAN.

Witnesses:
GEO. W. GREGORY,
MARGARET A. DUNN.